United States Patent [19]

Panagiotou

[11] Patent Number: 4,760,509
[45] Date of Patent: Jul. 26, 1988

[54] PORTABLE ELECTRIC LIGHT
[75] Inventor: George N. Panagiotou, Encino, Calif.
[73] Assignee: Cool Lux Lighting Industries, Inc., North Hollywood, Calif.
[21] Appl. No.: 19,008
[22] Filed: Feb. 26, 1987
[51] Int. Cl.[4] .............................................. F21V 19/04
[52] U.S. Cl. ...................... 362/285; 362/3; 362/294; 362/368; 362/427
[58] Field of Search ............... 362/3, 18, 285, 271, 362/274, 294, 368, 427

[56] References Cited
U.S. PATENT DOCUMENTS

| | | | |
|---|---|---|---|
| 1,435,002 | 11/1922 | Goodwin | 362/294 |
| 2,465,034 | 3/1949 | Peters | 362/294 |
| 3,358,133 | 12/1967 | Thoman et al. | 362/374 |
| 3,751,657 | 8/1973 | Sangiamo et al. | 362/294 |
| 4,538,217 | 8/1985 | Ewing et al. | 362/427 |
| 4,598,347 | 7/1986 | Peppers | 362/294 |

Primary Examiner—Ira S. Lazarus
Assistant Examiner—Sue Hagarman
Attorney, Agent, or Firm—Kenneth J. Hovet

[57] ABSTRACT

An electric light having a housing enclosed on the top and back end by a pivotable cover. The cover is hinged at the back upper corner of the housing sidewalls. A bulb and socket assembly is secured to a flange extending from the cover interior. The flange conducts heat from the bulb and socket assembly to the cover for dissipation into the atmosphere. When the cover is lifted by rotation about the hinge connection, the assembly will rotate with the cover and be readily accessible for repair or bulb replacement. For additional cooling, the cover back end is spaced from the housing to permit a flow of cooling air past the bulb and socket assembly.

8 Claims, 2 Drawing Sheets

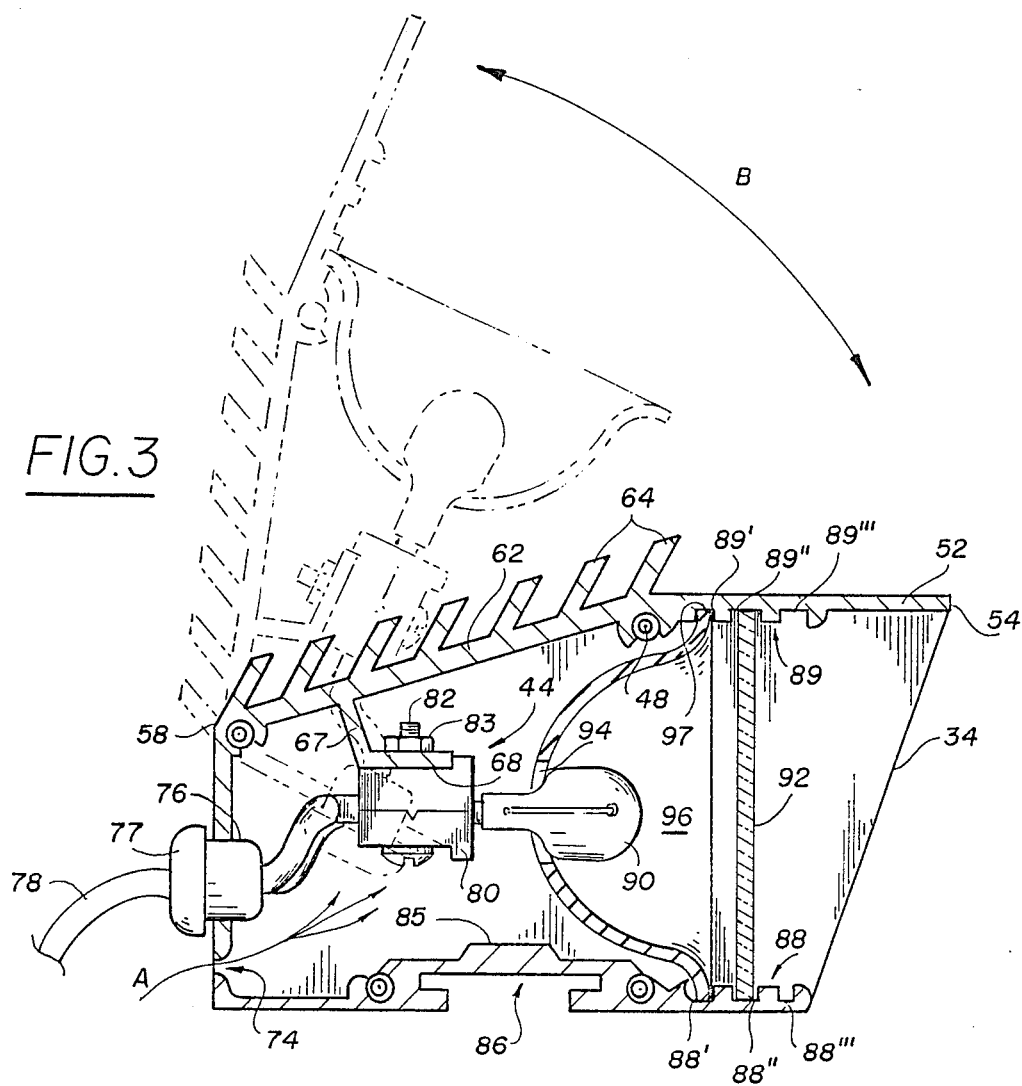
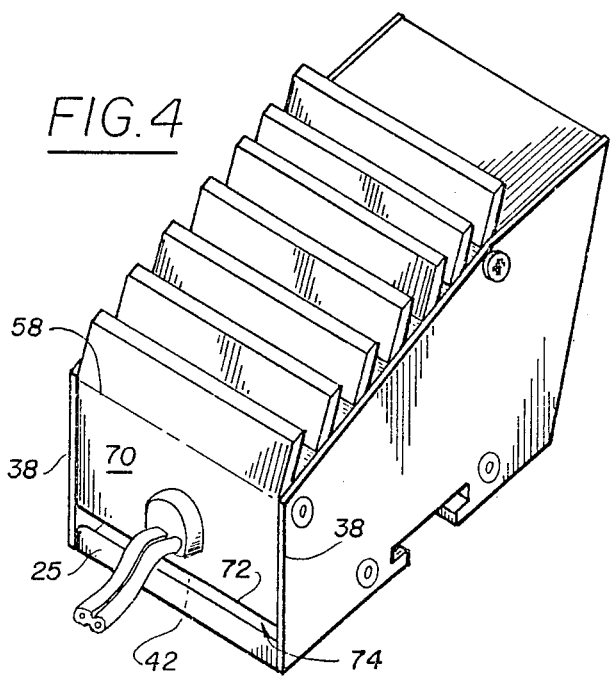
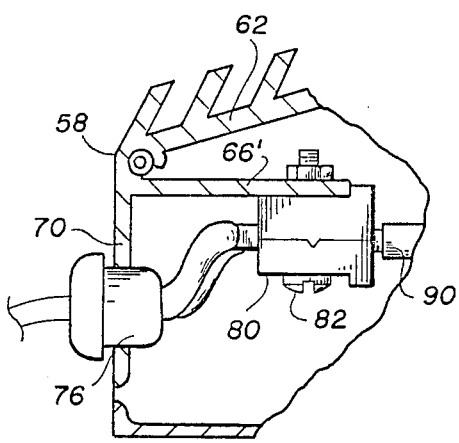

PORTABLE ELECTRIC LIGHT

BACKGROUND OF THE INVENTION

1. Field of the Invention

The present invention relates to lighting devices and, more particularly, to a portable electric light with a hinged cover and integral cooling means.

2. Description of the Prior Art

Small compact lighting fixtures that provide a high level of illumination are inherently difficult to design. Such high powered fixtures usually require ancillary cooling means and cumbersome heat transfer parts. To overcome these problems, the inventor devised an intense illumination light that includes oppositely hinged dual cover members. The cover members provided interior access and also functioned to dissipate heat through multiple venting slots. The light is described in copending patent application Ser. No. 234,945 filed Feb. 17, 1981 and is now U.S. Pat. No. 4,703,404.

SUMMARY OF THE INVENTION

The present invention comprises a portable light that has particular applicability for camcorders and photographic devices when it is desirable to supplement existing illumination. The fixture is very light in weight and small in size so that it may be mounted upon and used with portable cameras.

The invention includes an open housing comprising a base and upstanding sidewalls. A cover overlies the housing top and back openings. The cover is hingedly attached to the housing at an upper back corner and is rotatable to an open position. A bulb and socket assembly is secured to an inner flange on the cover and moves integrally with the cover.

The cover end wall is spaced above the housing base to provide an air vent for cooling the bulb. Also, the cover and flange are heat conductors for transferring heat energy away from the bulb and socket assembly.

BRIEF DESCRIPTION OF THE DRAWINGS

FIG. 3 is a cross-sectional view taken along lines 3—3 of FIG. 1 with the open cover in phantom.

FIG. 4 is a perspective back view of the light of FIG. 1.

FIG. 5 is a fragmentary cross-sectional view showing an alternative attachment means for the bulb and socket assembly.

DESCRIPTION OF THE PREFERRED EMBODIMENTS

Figure 1:
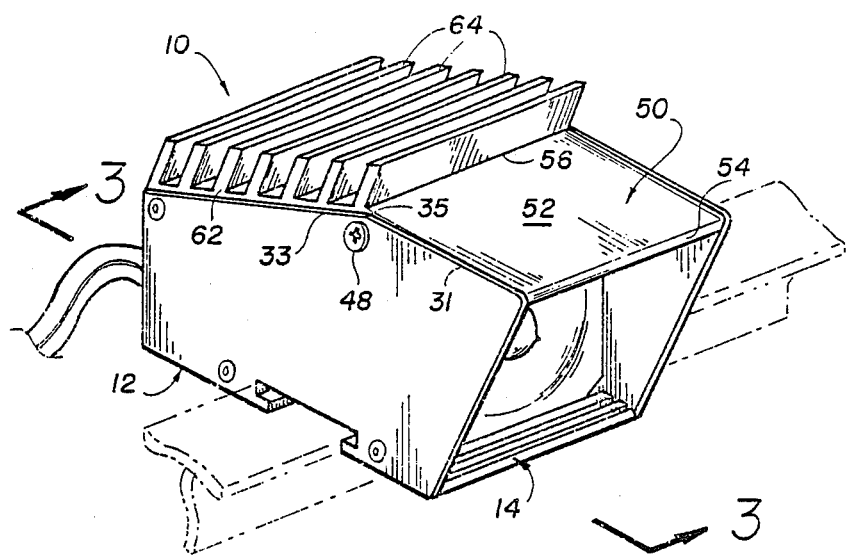
FIG. 1 is a perspective front view of the light of the present invention.

With reference now to the drawings, the overall light of the present invention is shown by reference numeral 10. The light is constructed of a housing 12 comprising a base 14 from which extend opposing upstanding sidewalls 16,18. The housing encloses a bulb and socket assembly shown generally by reference 44. The assembly includes an insulative socket 80 containing female electrical contacts for releasably receiving male contacts from bulb 90 in a manner known in the art. An electrical conductor 78 connects the female contacts with a source of electricity.

The base is preferably quadrilateral in planar outline with respective base side edges 20 and 21, base front end 22 and base back end 25. The sidewalls are thin polygonal shaped plates having a preferably planar surface. Each plate is fixed to a respective base side edge by rivets 23 which extend into base slots 24. The plates are identical in size and shape and extend vertically from the base side edges.

Each plate is defined by an upper edge 30 extending to a front corner 32. Front edge 34 extends downwardly from the front corner. Similarly, upper edge 30 merges with downwardly extending back edge 38 at connector corner 36. The front and back edges terminate at their respective junctures with sidewall bottom edge 40. The bottom edge is preferably coextensive with the bottom surface 42 of the base and extends along the base length.

With the above construction, the housing presents a generally U-shaped structure. It includes an open top 26 defined as the area between the upper edges 30 of the opposing sidewalls, an open back end 27 defined as the area between back edges 32 and an open front end 28 defined as the area between front edges 34. Note that upper edges 30 are segmented to include a forward straight edge section 31 and a rearward straight edge section 33. The sections are separated by peak 35 located approximately within the middle third portion of said upper edges.

Overlying the top opening and a portion of the back end opening is cover 50. The cover comprises a top member 60 and an integral end wall 70. It is constructed of a solid plate of heat conductive material that conforms in planar shape to the contour of sidewall upper edges 30.

The top member includes a flat front cover portion 52 that covers the area between forward edge sections 31. This portion extends from cover front edge 54 to ridge line 56.

The top member also includes rear cover portion 62. It covers the area between edge sections 33 and extends from ridge line 56 to back end 58. The upper surface of the rear cover portion preferably includes heat dissipation means shown as outwardly extending fins 64. The fins facilitate removal of heat energy, generated by the bulb in the housing, by enlarging the heat transfer area between the cover and surrounding air.

To further enhance heat dissipation, the cover includes a heat bridge attachment means for the bulb and socket assembly. This comprises flange 66 extending downwardly from the underside of rear cover portion 62. The flange is constructed of heat transfer material and is most conveniently an integral part of the overall metallic cover.

Figure 2:
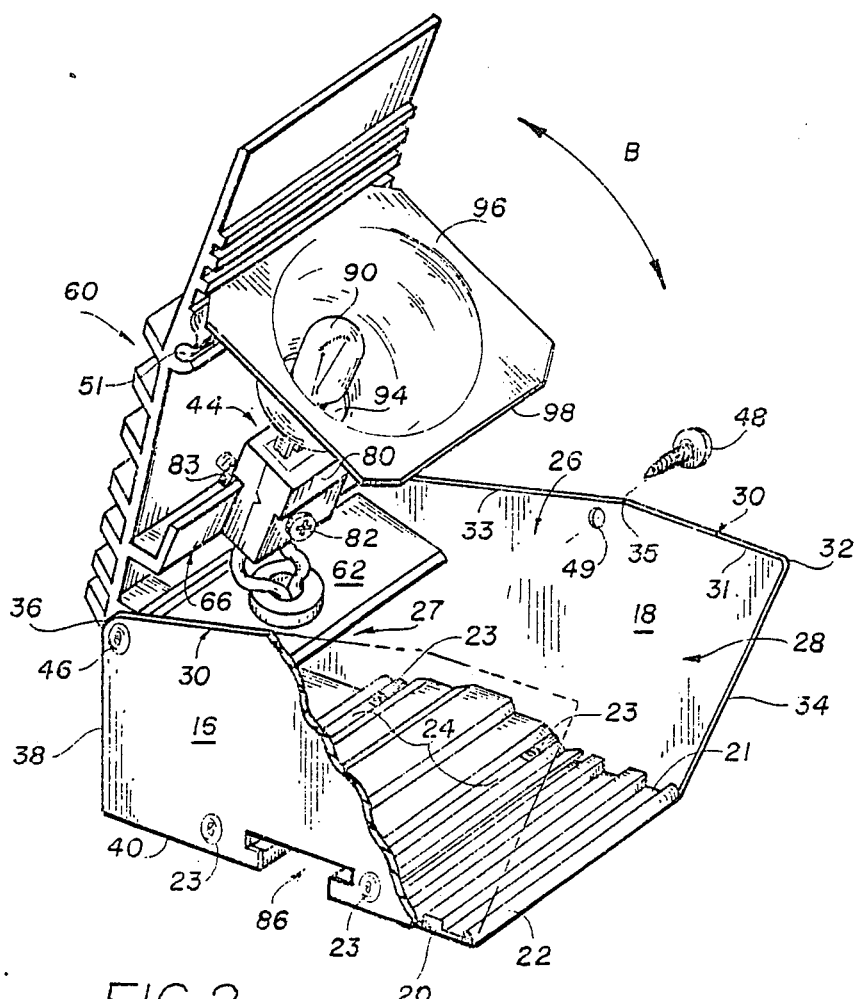
FIG. 2 is a view similar to FIG. 1 showing the cover in an open position and a fragmentary sidewall.

As shown in FIGS. 2 and 3, the flange includes downwardly extending offset leg 67 that connects the cover underside with socket leg 68. The socket leg provides a platform to which socket 80 can be mounted by fastener means shown as bolt 82 and nut 83. The socket leg is aligned relative to the cover to dispose the socket electrical contacts (not shown) and bulb 90 horizontally and facing front end opening 28 when the cover is in a closed position. Offset leg 67 functions to spatially position the bulb within the housing and center the bulb relative to the front end opening.

Alternatively, FIG. 5 shows flange 66' comprising a flat plate extending directly from end wall 70. In this embodiment, the plate functions in the same manner as the L-shaped flange 66. The plate extends into the housing from the inner surface of end wall 70 a predetermined distance to locate the bulb and socket assembly in the above-described centered position. It is constructed of metallic heat conductive material and, therefore, provides a heat transfer bridge between the bulb and socket assembly to the end wall. The socket is attached to flange 66' with the nut and bolt fastening means shown with flange 66.

As best seen in FIG. 4, end wall 70 covers the area between sidewall back edges 38 from cover back end 58 downwardly to a terminal end 72. The terminal end is spaced above base back end 25 a predetermined distance to form vent opening 74. As so constructed, the end wall covers a major portion of the back end area of the housing with a minor portion comprising the vent opening. The opening permits ambient air to flow into the housing interior, as shown by arrows A, and cool the bulb and socket assembly.

End wall 70 also includes a central opening 76 with a corresponding annular grommet 77. The grommet provides securement for electrical conductor 78 which connects socket 80 with a source of electrical power.

An advantageous feature of the invention is the ability to swing the cover in the direction of arrow B from a closed operative position, as shown in FIG. 1, to an open position, as shown in FIG. 2. The rotation is readily effected by providing a pivot means comprising a hinge pin between each connector corner 36 and respective opposing corners of cover back end 58. Because the bulb and socket assembly is connected to the attachment means which, in turn, is part of the cover, rotation of the cover will cause a like movement of the bulb and socket assembly. Repair work and bulb replacement is thereby greatly facilitated.

When the cover is in a closed operative position, it is desirable to secure it against unwanted movement. This is accomplished with securement means shown as cover fastener 48. Most conveniently, the fastener comprises a screw extending through sidewall orifice 49 into cover slot 51. The orifice is adjacent peak 35 and slot 51 is below cover ridge line 56 for matching alignment on both sides of the housing. Friction engagement means, mechanical and cloth fasteners or magnetic means could also be used as securement means with the present invention.

As best shown in FIGS. 2 and 3, the base includes an inner upraised midportion 85. This midportion provides for the formation of a mounting means shown as T-slot 86. The T-slot extends across the width of the base flat bottom between opposing base side edges 20,21. Each sidewall bottom edge 40 is cut-out in a shape corresponding to the cross-sectional shape of the T-slot. This provides clear access for connection with camera accessory mounting brackets and the like.

On the inner base surface, forward of the upraised midportion, are a plurality of transversely extending base grooves 88. These grooves are coextensive with, and directly below, corresponding grooves 89 facing downwardly from the underside of front cover portion 52. The innermost grooves 88',89' are used to secure the respective top and bottom edges 97,98 of reflector 96. Optionally, the reflector top edge 97 can be fixed to groove 89' so it will move with the cover and avoid unnecessary stress on bulb 90.

As shown, the reflector has a quadrilateral outline corresponding to the housing cross-sectional shape. It is concave with a central aperture 94 through which the bulb extends.

With further reference to FIGS. 2 and 3, corresponding grooves 88'' and 89'' are shown as being used to retain diffusion lens 92. Remaining grooves 88''' and 89''' can be similarly used to hold light filters, other lens and protective glass shields known in the art.

While the invention has been described with respect to preferred embodiments, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In an electric light having a socket into which is fitted a bulb with a conductor extending from the socket to an electrical power source and a light reflector surrounding the bulb having top and bottom edges, wherein the improvement comprises:
   a housing defined by a base having a base back end and opposing upstanding sidewalls, said housing having an open top, an open back end and an open front end toward which said bulb and reflector face;
   a heat conductive cover comprising a top member extending over said open top to a cover back end and an end wall extending downwardly from said cover back end over said open back end to a terminal end spaced above said base back end, said cover having an underside for securing said reflector top edge during cover movement and a heat dissipative flange to which is connected the socket; and,
   pivot means connecting said cover back end to said sidewalls so that the cover member may rotate about said pivot means.

2. The light of claim 1 wherein said sidewalls each have a back edge and an upper edge which merge to form a connector corner and said pivot means comprises at least one pin hinging said cover back end to each of said connector corners.

3. The light of claim 2 wherein said base has an interior surface which is grooved to releasably receive said light reflector bottom edges.

4. The light of claim 3 wherein the exterior surface of said base includes mounting means.

5. The light of claim 2 wherein said top member includes a rear cover portion having a plurality of outwardly extending heat dissipative fins.

6. The light of claim 2 wherein said top member includes a flat front cover portion which is coextensive with said sidewall upper edges when the cover is in a closed position.

7. The light of claim 6 including securement means for releasably retaining the cover in a closed position.

8. The light of claim 7 wherein said housing includes means for mounting said light on a support structure.

* * * * *